United States Patent
Kim et al.

(10) Patent No.: US 9,257,927 B2
(45) Date of Patent: Feb. 9, 2016

(54) APPARATUS AND METHOD FOR CONTROLLING STEPPING MOTOR

(75) Inventors: Tae-yun Kim, Daegu (KR); Jae-chung Lim, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 230 days.

(21) Appl. No.: 13/490,770

(22) Filed: Jun. 7, 2012

(65) Prior Publication Data

US 2013/0119917 A1 May 16, 2013

(30) Foreign Application Priority Data

Nov. 14, 2011 (KR) .................. 10-2011-0118517

(51) Int. Cl.
*H02P 8/00* (2006.01)
*G05B 19/40* (2006.01)
*H02P 8/16* (2006.01)
*H02P 8/32* (2006.01)
*H02P 8/14* (2006.01)

(52) U.S. Cl.
CPC ........ *H02P 8/16* (2013.01); *H02P 8/165* (2013.01); *H02P 8/14* (2013.01); *H02P 8/32* (2013.01)

(58) Field of Classification Search
CPC .......... H02P 8/14; H02P 8/32; H02P 8/12; H02P 8/34; H02P 8/36; H02P 8/00; H02P 8/22; G05B 19/40

USPC ................................... 318/696, 685
See application file for complete search history.

(56) References Cited

FOREIGN PATENT DOCUMENTS

| JP | 05-038196 A | | 2/1993 | |
|---|---|---|---|---|
| JP | 05038196 A | * | 2/1993 | ............... H02P 8/14 |
| JP | 2010-057272 A | | 3/2010 | |
| JP | 2010057272 A | * | 3/2010 | ............... H02P 8/14 |

* cited by examiner

*Primary Examiner* — Bentsu Ro
*Assistant Examiner* — Zemenay Truneh
(74) *Attorney, Agent, or Firm* — Drinker Biddle & Reath LLP (57) ABSTRACT

An apparatus and method is provided for controlling a stepping motor in a digital photographing apparatus, the apparatus including: a temperature measuring unit for measuring a temperature; and a digital signal processor (DSP) for determining a measured temperature driving value of the stepping motor in correspondence with the measured temperature, changing the determined driving value based on a target position to which the stepping motor is supposed to move, and outputting the changed driving value to the stepping motor. Accordingly, power consumption of image capturing apparatuses may be eventually reduced by reducing power consumption of a stepping motor by driving the stepping motor with different driving values depending on temperatures and positions thereof.

24 Claims, 9 Drawing Sheets

1. ROOM TEMPERATURE      o : DRIVING OK, x : DRIVING NG

|      | #1 | #2 | #3 | #4 | #5 | #6 | #7 | #8 | #9 | #10 | Max CURRENT(mA) | VOLTAGE (V) | POWER (mW) | REMARKS |
|------|----|----|----|----|----|----|----|----|----|-----|-----------------|-------------|------------|---------|
| 5.0V | o | o | o | o | o | o | o | o | o | o | 197 | 4.14 | 798.69 | |
| 4.5V | o | o | o | o | o | o | o | o | o | o | 182 | 3.82 | 681.69 | |
| 4.0V | o | o | o | o | o | o | o | o | o | o | 156 | 3.28 | 500.83 | |
| 3.5V | o | o | o | o | o | o | o | o | o | o | 139 | 2.92 | 397.63 | |
| 3.0V | o | x | x | o | x | o | x | x | x | o | 116 | 2.44 | 279.92 | |
| 2.5V | x | x | x | x | x | x | x | x | x | x | 97 | 2.04 | 194.64 | |

2. −10°

|      | #1 | #2 | #3 | #4 | #5 | #6 | #7 | #8 | #9 | #10 | Max CURRENT(mA) | VOLTAGE (V) | POWER (mW) | REMARKS |
|------|----|----|----|----|----|----|----|----|----|-----|-----------------|-------------|------------|---------|
| 5.0V | o | o | o | o | o | o | o | o | o | o | 223 | 4.39 | 960.07 | |
| 4.5V | o | o | o | o | o | o | o | o | x | o | 205 | 4.04 | 811.33 | |
| 4.0V | o | x | o | o | x | o | o | x | x | o | 181 | 3.57 | 632.48 | |
| 3.5V | x | x | x | x | x | x | x | x | x | x | 155 | 3.05 | 463.83 | |
| 3.0V | x | x | x | x | x | x | x | x | x | x | 131 | 2.58 | 331.31 | |
| 2.5V | x | x | x | x | x | x | x | x | x | x | 110 | 2.17 | 233.60 | |

2. −20°

|      | #1 | #2 | #3 | #4 | #5 | #6 | #7 | #8 | #9 | #10 | Max CURRENT(mA) | VOLTAGE (V) | POWER (mW) | REMARKS |
|------|----|----|----|----|----|----|----|----|----|-----|-----------------|-------------|------------|---------|
| 5.0V | x | o | o | o | x | x | o | x | x | o | 227 | 4.517 | 1004.92 | |
| 4.5V | x | x | x | x | x | x | x | x | x | x | 206 | 4.099 | 827.59 | |
| 4.0V | x | x | x | x | x | x | x | x | x | x | 185 | 3.682 | 667.46 | |
| 3.5V | x | x | x | x | x | x | x | x | x | x | 159 | 3.164 | 493.03 | |
| 3.0V | x | x | x | x | x | x | x | x | x | x | 133 | 2.647 | 344.97 | |
| 2.5V | x | x | x | x | x | x | x | x | x | x | 107 | 2.129 | 223.28 | |

2. 50°

|      | #1 | #2 | #3 | #4 | #5 | #6 | #7 | #8 | #9 | #10 | Max CURRENT(mA) | VOLTAGE (V) | POWER (mW) | REMARKS |
|------|----|----|----|----|----|----|----|----|----|-----|-----------------|-------------|------------|---------|
| 5.0V | o | o | o | o | o | o | o | o | o | o | 190 | 4.18 | 778.32 | |
| 4.5V | o | o | o | o | o | o | o | o | o | o | 171 | 3.76 | 630.44 | |
| 4.0V | o | o | o | o | o | o | o | o | o | o | 151 | 3.32 | 491.59 | |
| 3.5V | o | o | o | o | o | o | o | o | o | o | 129 | 2.84 | 358.78 | |
| 3.0V | o | o | o | o | o | o | o | x | o | o | 109 | 2.40 | 256.15 | |
| 2.5V | x | x | x | x | x | x | x | x | x | x | 91 | 2.00 | 178.54 | |

| TEMPERATURE RANGE | MAX VOLTAGE |
|---|---|
| EQUAL TO OR HIGHER THAN 40° | DRIVING AT 80% OF MAX VOLTAGE |
| 20°C ~ 40°C | DRIVING AT 85% OF MAX VOLTAGE |
| 0°C ~ 20°C | DRIVING AT 90% OF MAX VOLTAGE |
| −20°C ~ 0°C | DRIVING AT 95% OF MAX VOLTAGE |
| LESS THAN −20°C | MAX VOLTAGE |

| TARGET POSITION RANGE | Max voltage |
|---|---|
| E (FIFTH REGION) | DRIVING AT 80% OF MAX VOLTAGE |
| D (FOURTH REGION) | DRIVING AT 85% OF MAX VOLTAGE |
| C (THIRD REGION) | DRIVING AT 90% OF MAX VOLTAGE |
| B (SECOND REGION) | DRIVING AT 95% OF MAX VOLTAGE |
| A (FIRST REGION) | MAX VOLTAGE |

000
APPARATUS AND METHOD FOR CONTROLLING STEPPING MOTOR

CROSS-REFERENCE TO RELATED PATENT APPLICATION

This application claims the benefit of Korean Patent Application No. 10-2011-0118517, filed on Nov. 14, 2011, in the Korean Intellectual Property Office, the disclosure of which is incorporated herein in its entirety by reference.

BACKGROUND

Embodiments of the invention relate to an apparatus and method for controlling a stepping motor in a digital photographing apparatus.

Various driving units, such as a stepping motor, a voice coil motor, and an ultrasonic motor, are used as a driving unit for moving a focus lens group in a tube body of a digital photographing apparatus. Here, a stepping motor changes an excited state of a stator by an input pulse signal, wherein the stepping motor moves by a predetermined angle every time the excited state is changed and stops at a predetermined position when the excited state is not changed.

SUMMARY

Various embodiments of the invention provide an apparatus and method for controlling a stepping motor, whereby power consumption is reduced by driving the stepping motor with driving values depending on temperatures and positions thereof.

According to an embodiment, there is provided an apparatus for controlling a stepping motor, the apparatus including: a temperature measuring unit for measuring a temperature; and a digital signal processor (DSP) for determining a measured temperature driving value of the stepping motor in correspondence with the measured temperature, changing the determined driving value based on a target position to which the stepping motor is supposed to move, and outputting the changed driving value to the stepping motor.

The temperature measuring unit may measure a surrounding temperature of a tube body.

The DSP may store temperature driving values for driving the stepping motor in correspondence with temperatures.

The DSP may divide a moving section of the stepping motor into first to Nth regions and store divided-region driving values which are differently applied on a divided-region basis.

The DSP may divide a moving section of the stepping motor into first to Nth regions, store divided-region driving values which are differently applied on a divided-region basis, and output to the stepping motor a divided-region driving value corresponding to a region which includes a target position to which the stepping motor is supposed to move.

The measured temperature driving value, the temperature driving value, or the divided-region driving value may be a maximum voltage or current value for driving the stepping motor.

According to another embodiment, there is provided an apparatus for controlling a stepping motor, the apparatus including: a storage unit for storing temperature driving values of the stepping motor in correspondence with temperatures and storing divided-region driving values which are differently applied based on a moving section of the stepping motor; a temperature measuring unit for measuring a temperature; and a digital signal processor (DSP) for searching the storage unit to determine a measured temperature driving value corresponding to the measured temperature, searching the storage unit for a divided-region driving value based on a target position to which the stepping motor is supposed to move, and outputting the found divided-region driving value to the stepping motor.

The temperature measuring unit may measure a surrounding temperature of a tube body.

The DSP may divide the moving section of the stepping motor into first to Nth regions.

The temperature driving value, the measured temperature driving value, or the divided-region driving value may be a maximum voltage or current value for driving the stepping motor.

According to another embodiment, there is provided a method of controlling a stepping motor, the method including: measuring a temperature; determining a measured temperature driving value of the stepping motor in correspondence with the measured temperature, and changing the determined driving value based on a target position to which the stepping motor is supposed to move and outputting the changed driving value to the stepping motor.

When the temperature is measured, a surrounding temperature of a tube body may be measured.

The method may further include storing temperature driving values for driving the stepping motor in correspondence with temperatures.

The method may further include dividing a moving section of the stepping motor into first to Nth regions and storing divided-region driving values which are differently applied on a divided-region basis.

The method may further include searching for a region including the target position to which the stepping motor is supposed to move; and outputting a divided-region driving value corresponding to the found region to the stepping motor.

The measured temperature driving value, the temperature driving value, or the divided-region driving value may be a maximum voltage or current value for driving the stepping motor.

According to another embodiment, there is provided a method of controlling a stepping motor, the method including: establishing a storage unit for storing temperature driving values of the stepping motor in correspondence with temperatures and storing divided-region driving values which are differently applied based on a moving section of the stepping motor; measuring a temperature; and searching the storage unit to determine a measured temperature driving value corresponding to the measured temperature, searching the storage unit for a divided-region driving value based on a target position to which the stepping motor is supposed to move, and outputting the found divided-region driving value to the stepping motor.

When the temperature is measured, a surrounding temperature of a tube body may be measured.

The moving section of the stepping motor may be divided into first to Nth regions.

The temperature driving value, the measured temperature driving value, or the divided-region driving value may be a maximum voltage or current value for driving the stepping motor.

Other aspects, features, and advantages besides those described above will be clear from the accompanying drawings, the claims, and the detailed description of the embodiments described below.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

The invention may allow various kinds of change or modification and various changes in form, and specific embodiments will be illustrated in drawings and described in detail in the specification. However, it should be understood that the exemplary embodiments do not limit the invention to a specific disclosing form but include every modified, equivalent, or replaced one within the spirit and technical scope of the invention. In the following description, well-known functions or constructions are not described in detail since they would obscure the embodiments of the invention with unnecessary detail.

Although terms, such as 'first' and 'second', can be used to describe various elements, the elements cannot be limited by the terms. The terms can be used to classify a certain element from another element.

The terminology used in the application is used only to describe specific embodiments and does not have any intention to limit the invention. An expression in the singular includes an expression in the plural unless they are clearly different from each other in a context. In the application, it should be understood that terms, such as 'include' and 'have', are used to indicate the existence of implemented feature, number, step, operation, element, part, or a combination of them without excluding in advance the possibility of existence or addition of one or more other features, numbers, steps, operations, elements, parts, or combinations of them.

The embodiments can be represented with functional blocks and various processing steps. These functional blocks can be implemented by various numbers of hardware and/or software configurations for executing specific functions. For example, the embodiments may adopt direct circuit configurations, such as memory, processing, logic, and look-up table, for executing various functions under control of one or more processors or by other control devices. The components of the embodiments can execute the various functions with software programming or software elements, the particular embodiments can be implemented by a programming or scripting language, such as C, C++, Java, or assembly language, with various algorithms implemented by a combination of a data structure, processes, routines, and/or other programming components. Functional aspects can be implemented with algorithms executed in one or more processors. In addition, the embodiments may adopt the prior art for electronic environment setup, signal processing and/or data processing. The terms, such as "mechanism", "element", "means", and "configuration", can be widely used and are not delimited as mechanical and physical configurations. The terms may include the meaning of a series of routines of software in association with a processor.

The invention will now be described more fully with reference to the accompanying drawings, in which exemplary embodiments of the invention are shown. Like reference numerals in the drawings denote like elements, and thus their repetitive description will be omitted.

Figure 1:
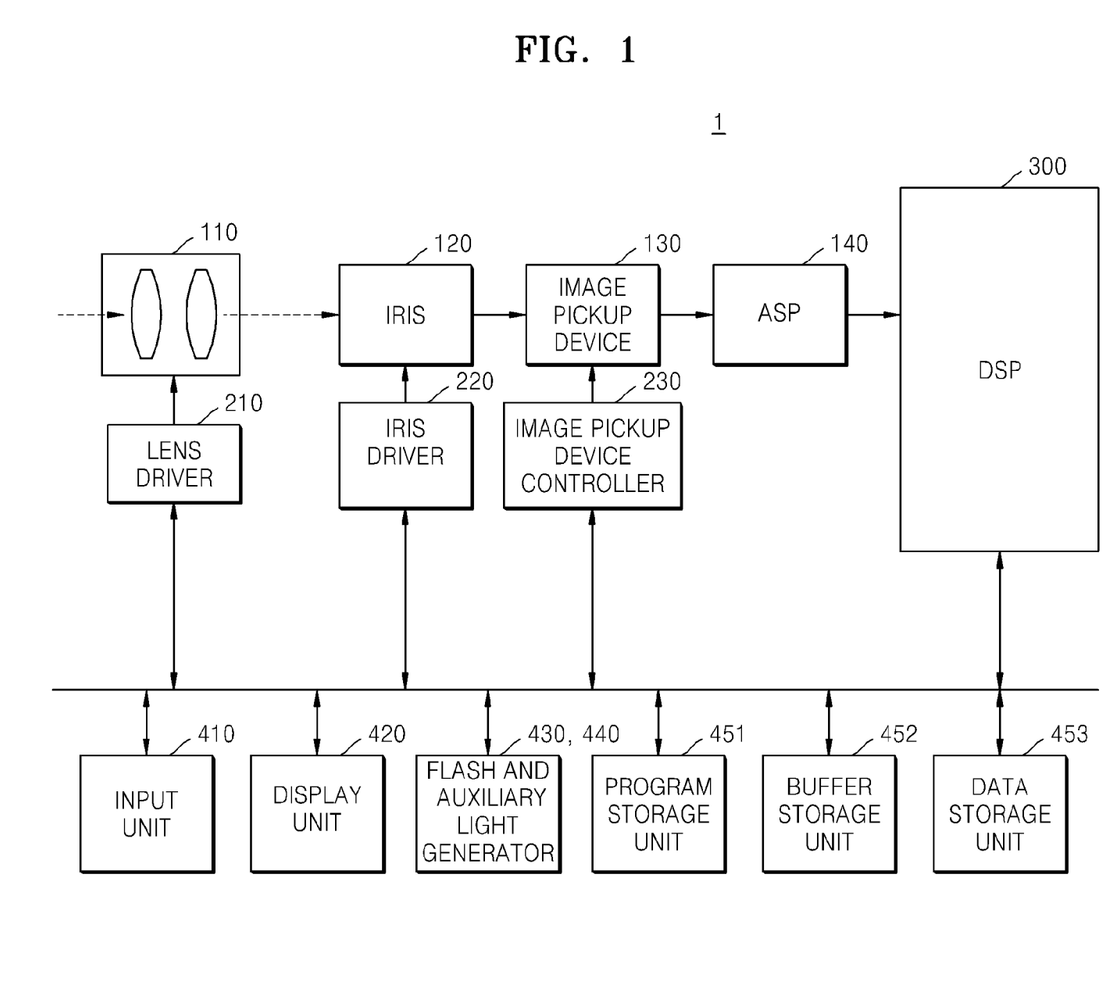
FIG. 1 is a block diagram of a digital camera as a digital photographing apparatus according to an embodiment of the invention.

FIG. 1 is a block diagram of a digital camera 1 as a digital photographing apparatus according to an embodiment. However, the digital photographing apparatus is not limited to the digital camera 1 shown in FIG. 1 and may also be applied to digital devices such as compact digital cameras, single-lens reflex cameras, hybrid cameras having advantages of a compact digital camera and a single-lens reflex camera, camera phones, Personal Digital Assistants (PDAs), and Portable Multimedia Players (PMPs).

Referring to FIG. 1, the digital camera 1 may include a lens unit 110, a lens driver 210, an iris 120, an iris driver 220, an image pickup device 130, an image pickup device controller 230, an Analog Signal Processor (ASP) 140, a Digital Signal Processor (DSP) 300, an input unit 410, a display unit 420, a flash and an auxiliary light generator 430 and 440, a program storage unit 451, a buffer storage unit 452, and a data storage unit 453.

The lens unit 110 concentrates an optical signal. The lens unit 110 may include a zoom lens for controlling narrowing or widening of an angle of view according to a focal length and a focus lens for focusing a subject. Each of the zoom lens and the focus lens may be formed by a single lens or a group of lenses.

The iris 120 adjusts the intensity of incident light by adjusting an open/close degree thereof.

The lens driver 210 and the iris driver 220 drive the lens unit 110 and the iris 120 by receiving a control signal from the DSP 300, respectively. The lens driver 210 may adjust a focal length and perform operations, such as Auto Focus (AF) and a focal point change, by adjusting a position of the focus lens via a stepping motor (214 of FIGS. 4 and 8), and perform a zoom change operation by adjusting a position of the zoom lens by the stepping motor 214. The iris driver 220 adjusts an open/close degree of the iris 120, and in particular, performs operations, such as AF, Auto Exposure (AE) compensation, focus change, and subject depth adjustment by adjusting an iris value (F number).

The optical signal passing through the lens unit 110 forms an image of a subject on a light-reception face of the image pickup device 130. The image pickup device 130 may include a Charge-Coupled Device (CCD), a Complementary Metal Oxide Semiconductor Image Sensor (CIS), or a high-speed image sensor for converting the optical signal to an electric signal. The image pickup device 130 may adjust its sensitivity under control of the image pickup device controller 230. The image pickup device controller 230 may control the image pickup device 130 in response to a control signal automatically generated by an image signal input in real-time or a control signal manually inputted by a manipulation of a user. The digital camera 1 may further include a shutter (not shown) as a mechanical shutter in which a cover moves upwards and downwards.

The ASP 140 generates a digital image signal by performing noise reduction, gain adjustment, waveform standardization, and analog-to-digital conversion of an analog signal provided from the image pickup device 130.

The input unit 410 is a device via which a user inputs a control signal. The input unit 410 may include a shutter release button for opening and closing the shutter to expose the image pickup device 130 to light for a predetermined time, a power button for supplying power, a wide-angle zoom button and a telescopic zoom button for widening or narrowing an angle of view in response to a corresponding input, character input keys, a mode selection button for selecting a mode such as a camera mode and a play mode, a white balance setting function selection button, and an exposure setting function selection button. Although the input unit 410 may include various key buttons, the input unit 410 is not limited thereto and may be implemented in any user-input form, such as a keyboard, a touch pad, a touch screen, or a remote control.

The display unit 420 may include a Liquid Crystal Display (LCD), an organic luminescence display, or a Field Emission Display (FED) and may display state information of the digital camera 1 or a captured image.

The flash 430 is a device for brightening a subject by instantaneously emitting a bright light on the subject when the subject is photographed in a dark place, and a flash mode includes an automatic flash mode, a compulsive light emission mode, a light emission prohibit mode, a red-eye mode, and a slow synchro mode. The auxiliary light generator 440 provides auxiliary light to a subject so that the digital camera 1 can automatically focus on the subject quickly and correctly when the intensity of light is insufficient or for night photography.

The digital camera 1 also includes the program storage unit 451 for storing programs such as an operation system and applications for driving the digital camera 1, the buffer storage unit 452 for temporarily storing data required during a computation or result data, and the data storage unit 453 for storing image files including image signals and various kinds of information required by the programs.

The digital camera 1 also includes the DSP 300 for processing the digital image signal input from the ASP 140 and controlling components of the digital camera 1 in response to external input signals. The DSP 300 may perform image signal processing for image quality enhancement of an input image signal, such as noise reduction, gamma correction, color filter array interpolation, color matrix, color correction, and color enhancement. In addition, the DSP 300 may generate an image file by compressing image data generated by performing the image signal processing for image quality enhancement. In addition, the DSP 300 may restore (decompress) image data from a generated image file. The compressed image file may be stored in the data storage unit 453. In addition, the DSP 300 may generate control signals for controlling a zoom change, a focus change, and AE compensation by executing programs stored in the program storage unit 451 and may provide the generated control signals to the lens driver 210, the iris driver 220, and the image pickup device controller 230 to generally control the lens unit 110, the iris 120, and the image pickup device 130, respectively. According to an embodiment, the DSP 300 drives the stepping motor 214 by determining a driving value of the stepping motor 214 included in the lens driver 210 in correspondence with a measured temperature, changing the determined driving value based on a target position to which the stepping motor 214 is supposed to move, and outputting the changed driving value to the lens driver 210. According to another embodiment, the DSP 300 drives the stepping motor 214 by searching a storage unit (216 of FIG. 8), which stores driving values of a stepping motor in correspondence with temperatures and stores driving values which are differently applied based on a moving section of the stepping motor, to determine a driving value corresponding to a measured temperature, searching the storage unit 216 for a driving value based on a target position to which the stepping motor 214 is supposed to move, and outputting the found driving value to the lens driver 210. To do this, the DSP 300 may further include a storage unit 310, a maximum voltage determiner 320, and a driving voltage determiner 330. A detailed operation of the DSP 300 is described with reference to FIGS. 4 to 8 below.

Figure 2A:
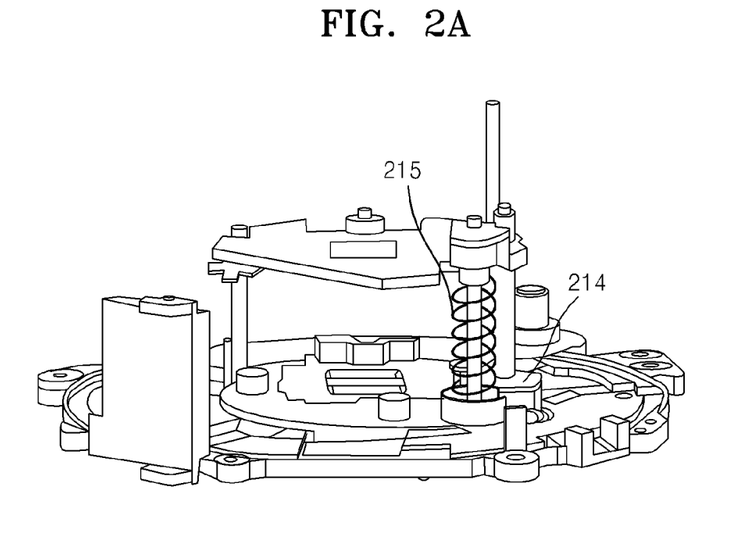
FIGS. 2A and 2B are perspective views for describing driving of a stepping motor.
Figure 2B:
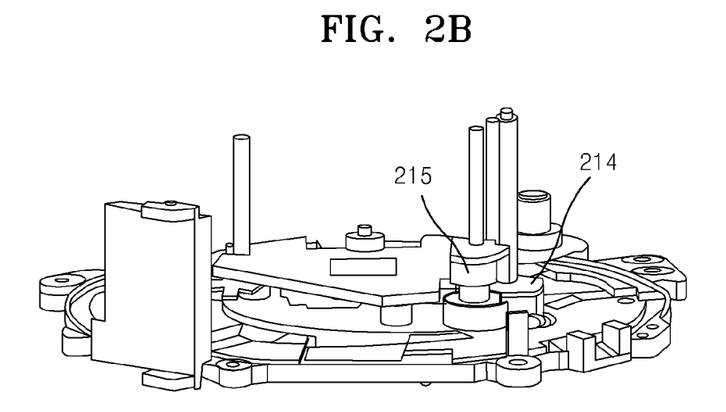

FIGS. 2A and 2B are perspective views for describing driving of the stepping motor 214.

The stepping motor 214 is a motor rotating in synchronization with a power pulse, and characteristics of the stepping motor 214 may be summarized as follows. First, since a total angle of rotation of the stepping motor 214 is proportional to a total number of input pulses, a rotation speed of the stepping motor 214 is proportional to a frequency of the input pulses. Second, a step angle may be set to a small angle (less than 1°) or a large angle (30°, 45°, 90°, or 180°). Third, a degree of position precision of a rotator is high. Although a stop angle error generally depends on a motor, the stop angle error is within a range of ±1/20 and ±1/40 of the step angle, and an error in an angle of rotation does not appear in the next step accumulatively. Fourth, the stepping motor 214 has excellent start and stop characteristics due to a high torque-to-mass ratio. However, vibration and idling phenomena in a predetermined frequency easily occur. Fifth, although the stepping motor 214 operates in response to a relatively high frequency pulse input (about 1200 pulses per second in a basic driving method), the stepping motor 214 may miss an input pulse according to an external load or in a case of a high frequency pulse input. Sixth, since the stepping motor 214 has a stop torque, the stepping motor 214 tends to stably stop at a current position unless an input pulse is applied. Seventh, the stepping motor 214 is unsuitable for high power or high speed.

To drive the stepping motor 214, a motor driver (213 of FIG. 4) generates a step signal in response to a control signal received from the DSP 300, amplifies the generated step signal to a voltage and current of the step signal capable of driving the stepping motor 214, and outputs the amplified step signal to the stepping motor 214. In this case, as a voltage level output to the stepping motor 214 increases, a current flowing through a coil of the stepping motor 214 increases, causing an increase in torque of the stepping motor 214. A torque required to move the focus lens group varies according to a temperature and position of the focus lens group due to a coupled shape change of structures depending on the temperature and structural characteristics of a focus lens module using a spring 215. In general, the stepping motor 214 is driven to move the focus lens group by using a high voltage to not cause problems to the movement of the focus lens group, without taking into consideration the torque required according to a temperature and a position of the focus lens group. This method is simple in terms of control but results in unnecessary power consumption from driving the stepping motor 214 at a high voltage even for a voltage reducible part.

A torque required to move the focus lens group to a target position varies according to a position of the focus lens group, because the focus lens group has a fixed position according to a force of the spring 215, as shown in FIGS. 2A and 2B. When the spring 215 is a compression spring, a torque required for a lens barrel (not shown) as shown in FIG. 2A to move downwards is less than a torque required for the lens barrel as shown in FIG. 2B to move downwards, since the lens barrel as shown in FIG. 2B is at a lower position than the lens barrel as shown in FIG. 2A. The reason is because a force of the compressed spring 215, as shown in FIG. 2B, is greater than a force of the released spring 215, as shown in FIG. 2A, in a case where a torque of the stepping motor 214 moves the lens barrel downwards against a force of the spring 215.

Figure 3:
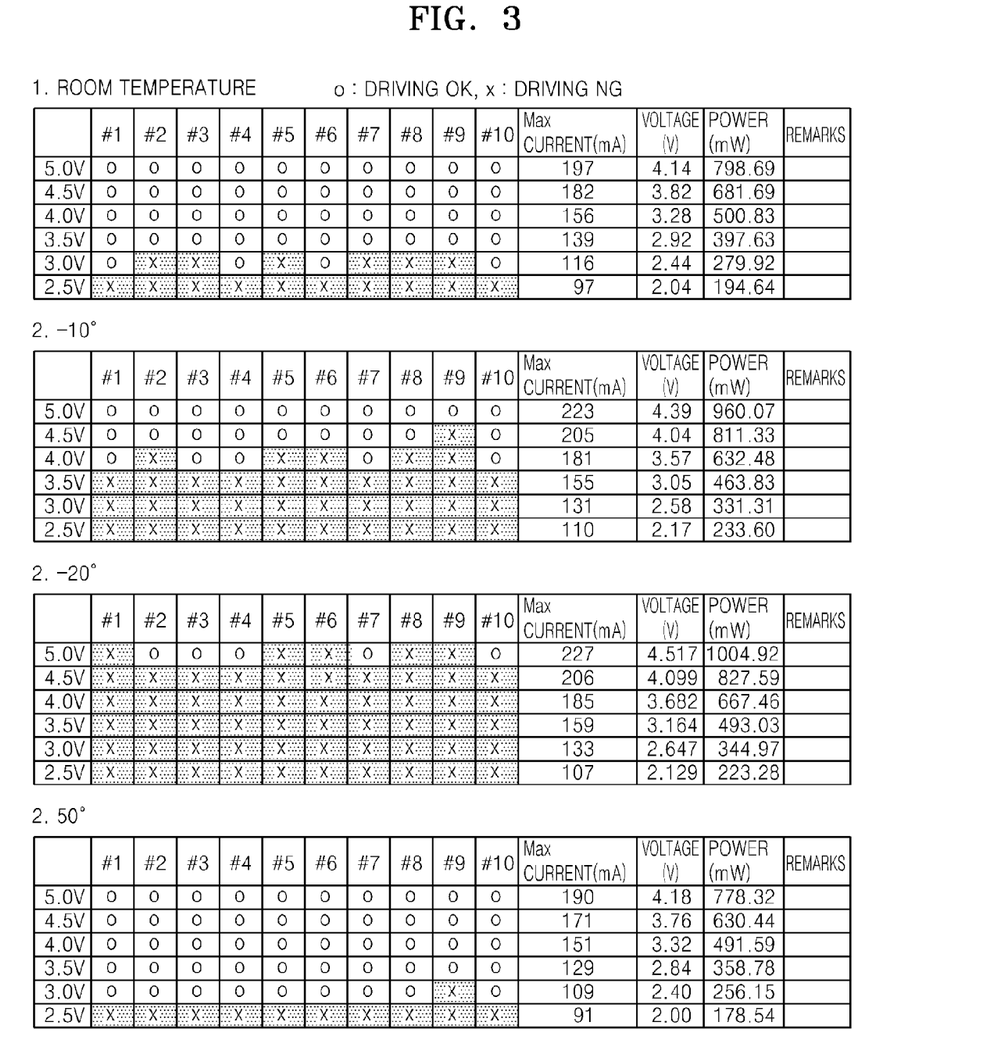
FIG. 3 comprises tables showing a minimum driving voltage of the stepping motor of FIGS. 2A and 2B per temperature.

In addition, a load of a structure and a resistance of the stepping motor 214 vary according to a temperature condition. In general, the higher a temperature is, the larger the torque is needed to move the focus lens group according to a coupled shape change of the focus lens group and its surrounding structure. FIG. 3 illustrates tables showing a minimum driving voltage of the stepping motor 214 per temperature with respect to various tube bodies. In FIG. 3, a shaded part indicates a faulty operation of the stepping motor 214, wherein the lower a temperature is, the higher a minimum driving voltage is, due to a poor structural operation. As described above, a torque of the stepping motor 214 required to move the focus lens group may vary according to a position and temperature condition of the focus lens group.

Figure 4:
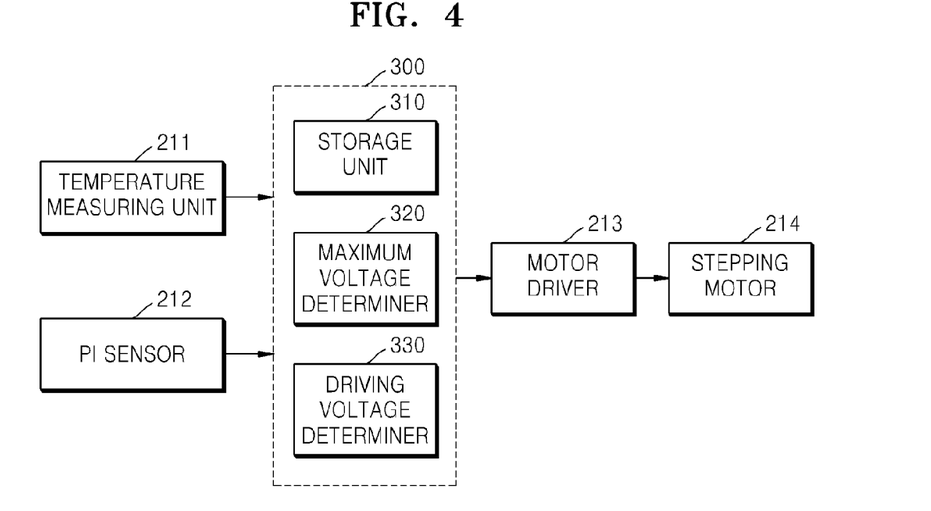
FIG. 4 is a detailed block diagram of a stepping motor controlling apparatus in the digital photographing apparatus of FIG. 1, according to an embodiment of the invention.

FIG. 4 is a detailed block diagram of a stepping motor controlling apparatus in the digital photographing apparatus of FIG. 1, according to an embodiment of the invention. Referring to FIG. 4, the stepping motor controlling apparatus may include a temperature measuring unit 211, a Photo Interrupt (PI) sensor 212, the motor driver 213, the stepping motor 214, and the DSP 300. The PI sensor 212, the motor driver 213, and the stepping motor 214 may be included in the lens driver 210. The temperature measuring unit 211 may be included in the lens driver 210 or may be separated from the lens driver 210. In the current embodiment, the DSP 300 may include the storage unit 310, the maximum voltage determiner 320, and the driving voltage determiner 330.

The temperature measuring unit 211 measures a temperature outside the tube body when the digital camera 1 is turned on. The temperature measuring unit 211 may include a temperature measuring sensor, such as a platinum-resistance temperature sensor, a thermistor, a thermocouple, or a bimetal. However, the temperature measuring sensor is not limited thereto and may be any device capable of measuring a temperature.

The PI sensor 212 detects a current position of the focus lens group when the digital camera 1 is turned on. The PI sensor 212 is configured in a concavo-convex form and includes a light-emitting unit and a light-receiving unit on both sides thereof based on a groove, wherein light emitted from the light-emitting unit is inputted to the light-receiving unit. If the focus lens group is located in the groove, the light emitted from the light-emitting unit is not input to the light-receiving unit, and if the focus lens group is located out of the groove, the light emitted from the light-emitting unit is input to the light-receiving unit.

The motor driver 213 generates a step signal in response to a control signal received from the DSP 300, amplifies the generated step signal to a voltage and current of the step signal capable of driving the stepping motor 214, and outputs the amplified step signal to the stepping motor 214.

The DSP 300 receives a temperature signal corresponding to a temperature measured by the temperature measuring unit 211, determines a driving value of the stepping motor 214, changes the determined driving value based on a target position to which the stepping motor 214 is supposed to move, and outputs the changed driving value to the motor driver 213. Here, the driving value of the stepping motor 214 may be a maximum voltage or maximum current value, and in the current embodiment, a maximum voltage value is used for convenience of description.

To do this, the DSP 300 includes the storage unit 310, the maximum voltage determiner 320, and the driving voltage determiner 330.

The storage unit 310 stores maximum voltages capable of driving the stepping motor 214 based on temperatures and the voltages are differently applied based on the moving section of the stepping motor 214.

Figure 5:
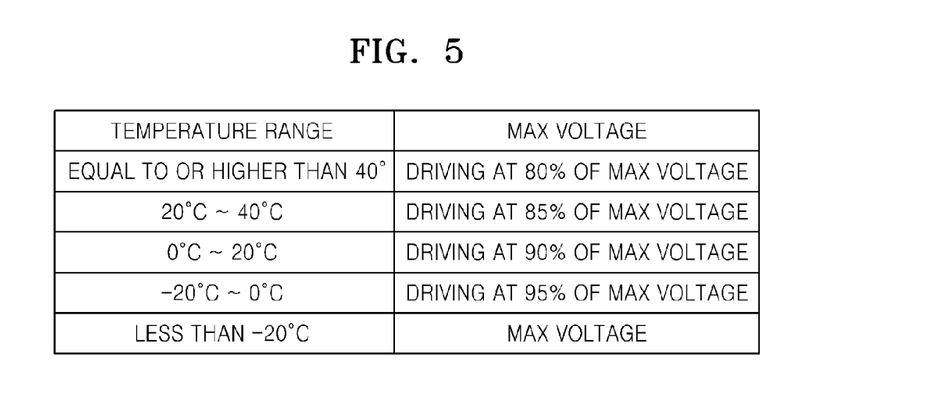
FIG. 5 is a table illustrating a maximum driving voltage of the stepping motor per temperature in the stepping motor controlling apparatus of FIG. 4.

FIG. 5 is a table illustrating maximum voltages of the stepping motor 214 based on temperatures, which are stored in the storage unit 310. A maximum voltage per temperature may be determined as 80% of a normal maximum voltage when a temperature is equal to or higher than 40° (temperatures referenced herein are in °C.), determined as 85% of the normal maximum voltage when a temperature is equal to or higher than 20° and less than 40°, determined as 90% of the normal maximum voltage when a temperature is equal to or higher than 0° and less than 20°, determined as 95% of the normal maximum voltage when a temperature is equal to or higher than −20° and less than 0°, and determined as the normal maximum voltage when a temperature is less than −20°.

The maximum voltage determiner 320 receives a temperature signal corresponding to the temperature measured by the temperature measuring unit 211 and determines a maximum voltage corresponding to a currently measured temperature by searching the storage unit 310. For example, assuming that a normal maximum voltage of the stepping motor 214 is set to 4.5 V and a temperature measured by the temperature measuring unit 211 is equal to or higher than 40°, the maximum voltage determiner 320 determines the maximum voltage as 3.6 V, i.e., 80% of 4.5 V. If the temperature measured by the temperature measuring unit 211 is equal to or higher than 20° and less than 40°, the maximum voltage determiner 320 determines the maximum voltage as 3.825 V, i.e., 85% of 4.5 V. If the temperature measured by the temperature measuring unit 211 is equal to or higher than 0° and less than 20°, the maximum voltage determiner 320 determines the maximum voltage as 4.05 V, i.e., 90% of 4.5 V. If the temperature measured by the temperature measuring unit 211 is equal to or higher than −20° and less than 0°, the maximum voltage determiner 320 determines the maximum voltage as 4.275 V, i.e., 95% of 4.5 V. If the temperature measured by the temperature measuring unit 211 is less than −20°, the maximum voltage determiner 320 determines the maximum voltage as 4.5 V, i.e., the normal maximum voltage.

The driving voltage determiner 330 calculates a target position of the stepping motor 214 in response to a driving command and drives the stepping motor 214 at a driving voltage corresponding to the calculated target position by searching the storage unit 310.

Figure 6:
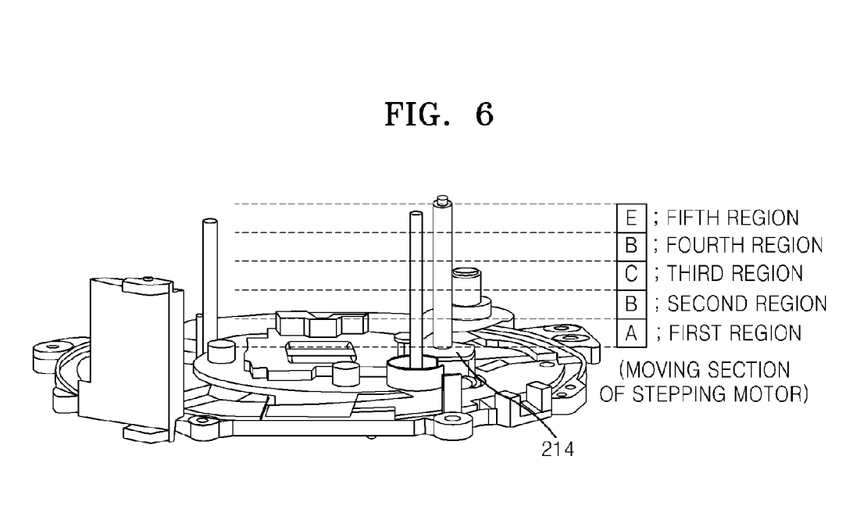
FIG. 6 is a perspective view for describing a moving section of the stepping motor in the stepping motor controlling apparatus of FIG. 4.

To do this, the storage unit 310 stores voltage values which are differently applied according to first to Nth regions obtained from dividing the moving section of the stepping motor 214, as shown in FIG. 6. The moving section of the stepping motor 214 is divided into first to fifth regions in the current embodiment but is not limited thereto. The reason that different driving voltages are applied on a region basis is because a load, i.e., an external force (spring force) affecting the stepping motor 214, varies according to a corresponding region of the moving section of the stepping motor 214, and accordingly, a region-based driving voltage is set considering the load.

Figure 7:
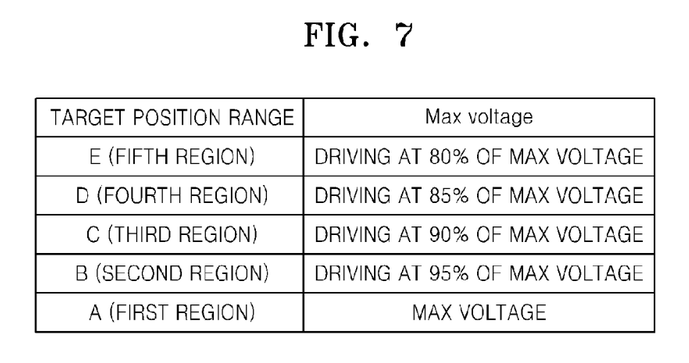
FIG. 7 is a table illustrating driving voltages which are differently set based on the moving section divided in FIG. 6.

FIG. 7 is a table illustrating driving voltages which are differently set and stored in the storage unit 310 based on the five regions obtained from dividing the moving section of the stepping motor 214. As shown in FIGS. 6 and 7, when a target position to which the stepping motor 214 is supposed to move is included in a first region of the moving section of the stepping motor 214, the maximum voltage determined by the maximum voltage determiner 320 is a driving voltage of the stepping motor 214. When the target position to which the stepping motor 214 is supposed to move is included in a second region of the moving section of the stepping motor 214, a voltage corresponding to 95% of the maximum voltage determined by the maximum voltage determiner 320 is a driving voltage of the stepping motor 214. When the target position to which the stepping motor 214 is supposed to move is included in a third region of the moving section of the stepping motor 214, a voltage corresponding to 90% of the maximum voltage determined by the maximum voltage determiner 320 is a driving voltage of the stepping motor 214. When the target position to which the stepping motor 214 is supposed to move is included in a fourth region of the moving section of the stepping motor 214, a voltage corresponding to 85% of the maximum voltage determined by the maximum voltage determiner 320 is a driving voltage of the stepping motor 214. When the target position to which the stepping motor 214 is supposed to move is included in a fifth region of the moving section of the stepping motor 214, a voltage corresponding to 80% of the maximum voltage determined by the maximum voltage determiner 320 is a driving voltage of the stepping motor 214.

In the above-described example, assuming that the normal maximum voltage is set to 4.5 V and the temperature measured by the temperature measuring unit 211 is equal to or higher than 0° and less than 20°, the maximum voltage determiner 320 determines the maximum voltage as 4.05 V, i.e., 90% of 4.5 V. Thereafter, the driving voltage determiner 330 calculates a target position to which the stepping motor 214 is supposed to move, searches the table shown in FIG. 7 to determine in which region the target position is included, and determines a final driving voltage of the stepping motor 214 by applying the maximum voltage determined as 4.05 V by the maximum voltage determiner 320 to the determined region.

For example, when the target position to which the stepping motor 214 is supposed to move is included in the first region, the driving voltage determiner 330 determines the maximum voltage determined as 4.05 V by the maximum voltage determiner 320 as the final driving voltage of the stepping motor 214. When the target position to which the stepping motor 214 is supposed to move is included in the second region, the driving voltage determiner 330 determines 3.8475 V, which is 95% of the maximum voltage determined as 4.05 V by the maximum voltage determiner 320, as the final driving voltage of the stepping motor 214. When the target position to which the stepping motor 214 is supposed to move is included in the third region, the driving voltage determiner 330 determines 3.645 V, which is 90% of the maximum voltage determined as 4.05 V by the maximum voltage determiner 320, as the final driving voltage of the stepping motor 214. When the target position to which the stepping motor 214 is supposed to move is included in the fourth region, the driving voltage determiner 330 determines 3.4425 V, which is 85% of the maximum voltage determined as 4.05 V by the maximum voltage determiner 320, as the final driving voltage of the stepping motor 214. When the target position to which the stepping motor 214 is supposed to move is included in the fifth region, the driving voltage determiner 330 determines 3.24 V, which is 80% of the maximum voltage determined as 4.05 V by the maximum voltage determiner 320, as the final driving voltage of the stepping motor 214.

As described above, power consumption of the digital photographing apparatus may be eventually reduced by reducing power consumption of the stepping motor 214 by differently applying a driving voltage of the stepping motor 214 that is required to move the focus lens group according to a target position and temperature condition of the focus lens group.

Figure 8:
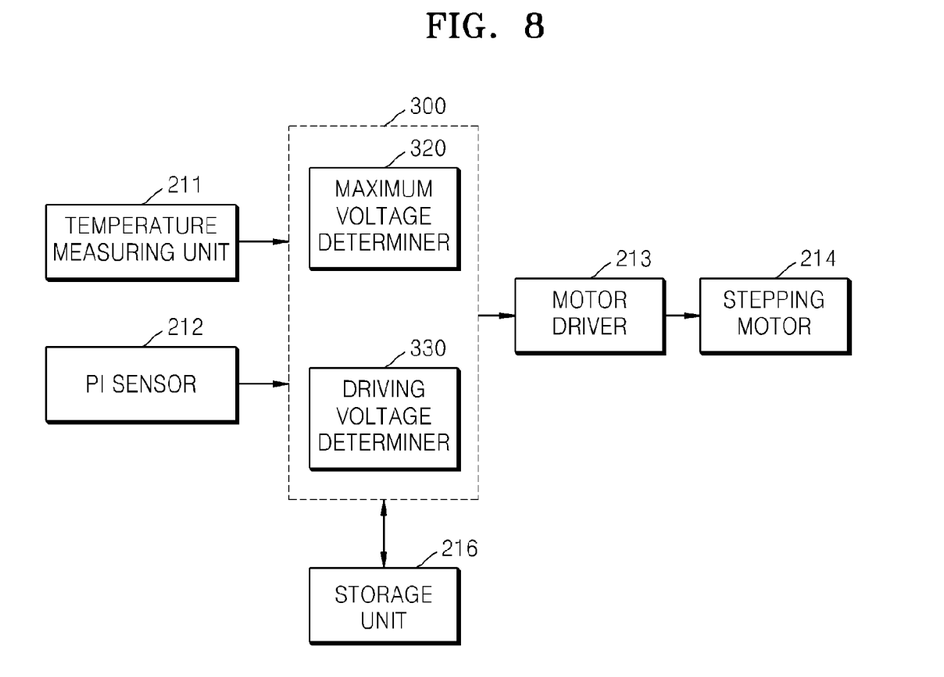
FIG. 8 is a detailed block diagram of a stepping motor controlling apparatus in the digital photographing apparatus of FIG. 1, according to another embodiment of the invention.

FIG. 8 is a detailed block diagram of a stepping motor controlling apparatus in the digital photographing apparatus of FIG. 1, according to another embodiment of the invention, illustrating that the storage unit 310 included in the DSP 300 in FIG. 4 is separated from the DSP 300. The storage unit 216 shown in FIG. 8 performs the same function as that of the storage unit 310 and may be replaced with the data storage unit 453 shown in FIG. 1. A detailed description of the storage unit 216 is omitted herein since it is the same as that of the storage unit 310 of FIG. 4.

Figure 9:
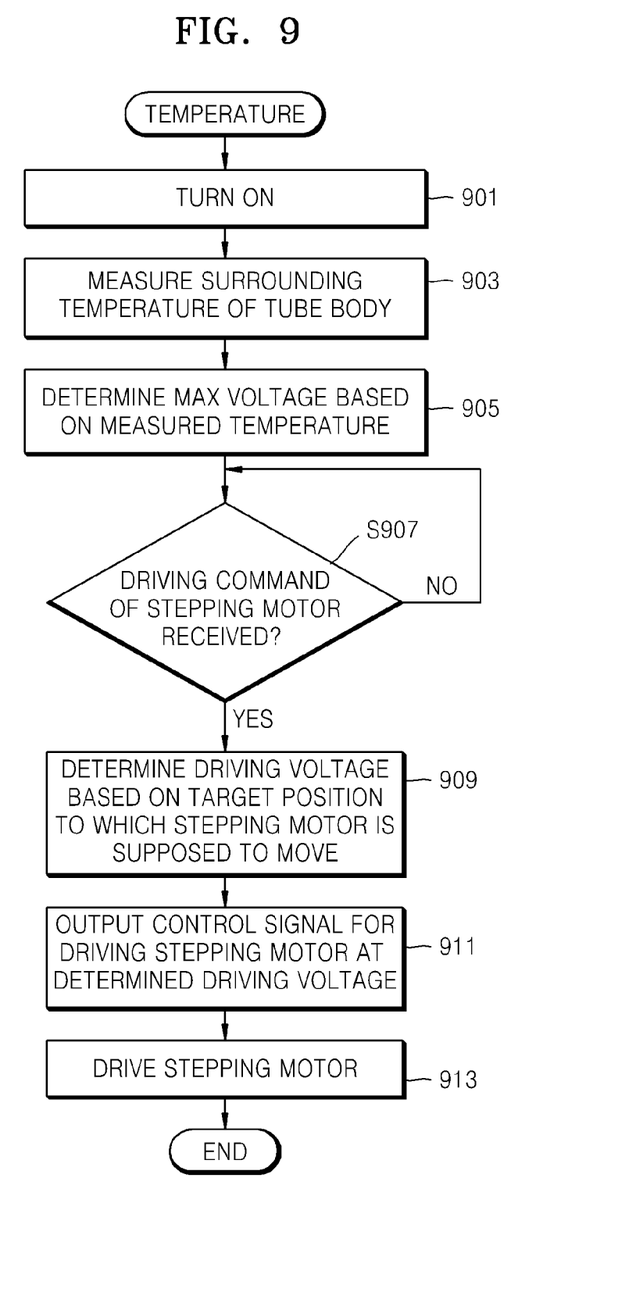
FIG. 9 is a flowchart illustrating a method of controlling a stepping motor, according to an embodiment of the invention.

FIG. 9 is a flowchart illustrating a method of controlling the stepping motor 214, according to an embodiment of the invention.

Referring to FIG. 9, if the digital camera 1 is turned on in operation 901, the temperature measuring unit 211 measures a surrounding temperature of the tube body and transmits the measured temperature to the DSP 300 in operation 903.

In operation 905, the DSP 300 receives a temperature measurement signal and determines a maximum voltage based on the measured temperature. The DSP 300 includes the storage unit 310 for storing maximum voltages capable of driving the stepping motor 214 according to temperatures. As shown in FIG. 5, the DSP 300 may determine the maximum voltage as 80% of a normal maximum voltage when the measured temperature is equal to or higher than 40°, may determine the maximum voltage as 85% of the normal maximum voltage if the measured temperature is equal to or higher than 20° and less than 40°, may determine the maximum voltage as 90% of the normal maximum voltage if the measured temperature is equal to or higher than 0° and less than 20°, may determine the maximum voltage as 95% of the normal maximum voltage if the measured temperature is equal to or higher than −20° and less than 0°, or may determine the maximum voltage as the normal maximum voltage if the measured temperature is less than −20°. For example, the normal maximum voltage of the stepping motor 214 may be set to 4.5 V, and a different maximum voltage is determined according to a measured temperature.

Thereafter, the DSP 300 determines in operation 907 whether a moving command of the stepping motor 214 has been received, and as a result of the determination, if a moving command of the stepping motor 214 has been received, the DSP 300 calculates a target position to which the stepping motor 214 is supposed to move and determines a driving voltage of the stepping motor 214 based on the calculated target position in operation 909.

Figure 10A:
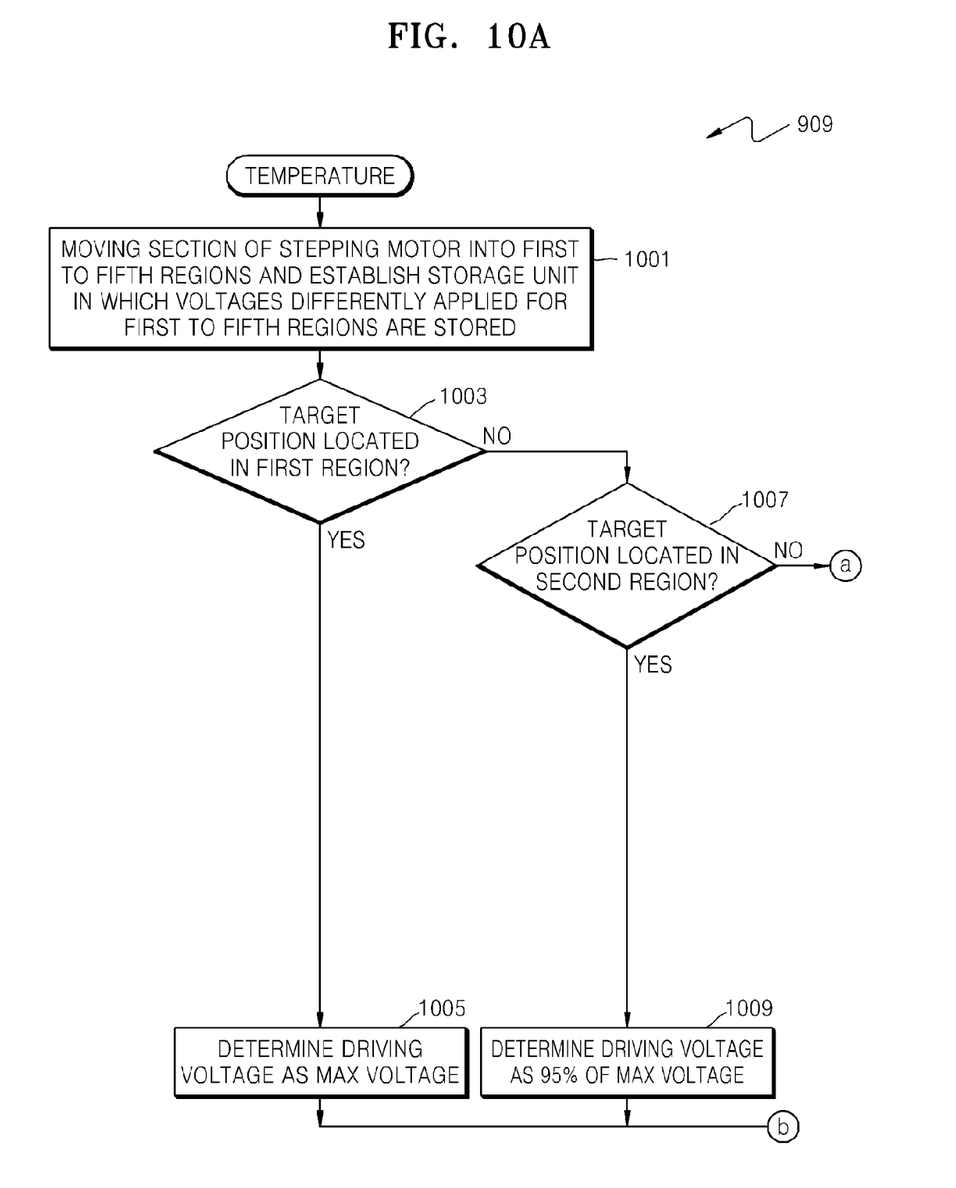
FIG. 10 is a flowchart illustrating a method of determining a driving voltage based on a target position to which the stepping motor is supposed to move in the method of FIG. 9, according to an embodiment of the invention.
Figure 10B:
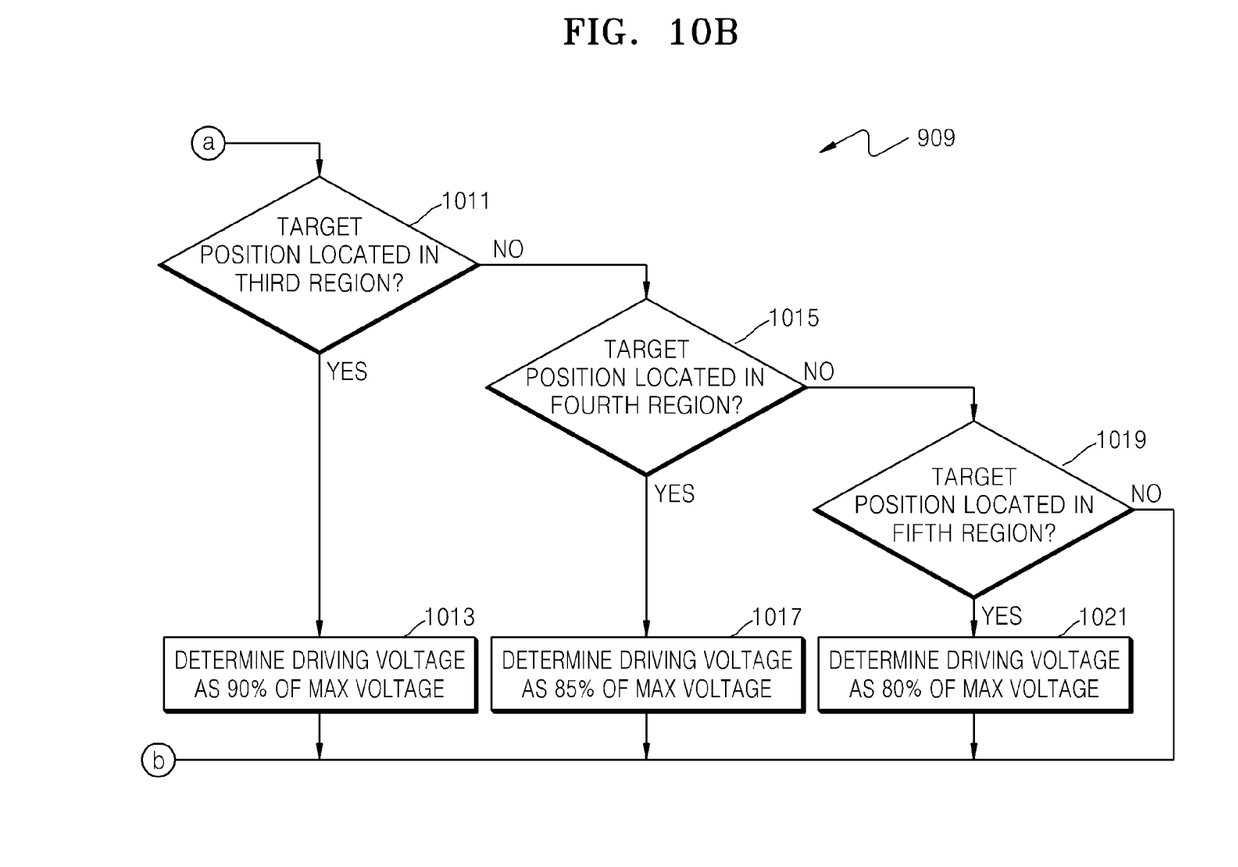

FIG. 10 is a flowchart illustrating a method of determining a driving voltage of the stepping motor 214 based on a target position to which the stepping motor 214 is supposed to move in the method of FIG. 9, according to an embodiment of the invention. Referring to FIG. 10, in operation 1001, the DSP 300 divides a moving section of the stepping motor 214 into first to fifth regions, as shown in FIG. 6, and establishes the storage unit 310 in which voltages, which are differently applied for the first to fifth regions, are stored. In the current embodiment, the moving section of the stepping motor 214 is divided into the first to fifth regions but is not limited thereto. The reason that different driving voltages are applied on a region basis is because a load, i.e., an external force (spring force) affecting the stepping motor 214, varies according to a corresponding region of the moving section of the stepping motor 214, and accordingly, a region-based driving voltage is set considering the load.

In operation 1003, the DSP 300 determines whether a target position to which the stepping motor 214 is supposed to move is included in the first region.

If the target position to which the stepping motor 214 is supposed to move is included in the first region, the DSP 300 determines the maximum voltage determined in operation 905 as a driving voltage of the stepping motor 214 in operation 1005. Assuming that the normal maximum voltage is set to 4.5 V and the measured temperature is equal to or higher than 20° and less than 40°, the maximum voltage is determined as 3.825 V, which is 85% of 4.5 V. Since the target position to which the stepping motor 214 is supposed to move is in the first region, the DSP 300 determines the determined maximum voltage, 3.825 V, as a final driving voltage of the stepping motor 214.

In operation 1007, the DSP 300 determines whether the target position to which the stepping motor 214 is supposed to move is included in the second region.

If the target position to which the stepping motor 214 is supposed to move is included in the second region, the DSP 300 determines a voltage corresponding to 95% of the maximum voltage determined in operation 905 as a driving voltage of the stepping motor 214 in operation 1009. Based on the above assumption, since the target position to which the stepping motor 214 is supposed to move is in the second region, the DSP 300 determines 3.63375 V, which is 95% of the determined maximum voltage, 3.825 V, as a final driving voltage of the stepping motor 214.

In operation 1011, the DSP 300 determines whether the target position to which the stepping motor 214 is supposed to move is included in the third region.

If the target position to which the stepping motor 214 is supposed to move is included in the third region, the DSP 300 determines a voltage corresponding to 90% of the maximum voltage determined in operation 905 as a driving voltage of the stepping motor 214 in operation 1013. Based on the above assumption, since the target position to which the stepping motor 214 is supposed to move is in the third region, the DSP 300 determines 3.4425 V, which is 90% of the determined maximum voltage, 3.825 V, as a final driving voltage of the stepping motor 214.

In operation 1015, the DSP 300 determines whether the target position to which the stepping motor 214 is supposed to move is included in the fourth region.

If the target position to which the stepping motor 214 is supposed to move is included in the fourth region, the DSP 300 determines a voltage corresponding to 85% of the maximum voltage determined in operation 905 as a driving voltage of the stepping motor 214 in operation 1017. Based on the above assumption, since the target position to which the stepping motor 214 is supposed to move is in the fourth region, the DSP 300 determines 3.251255 V, which is 85% of the determined maximum voltage, 3.825 V, as a final driving voltage of the stepping motor 214.

Finally, in operation 1019, the DSP 300 determines whether the target position to which the stepping motor 214 is supposed to move is included in the fifth region.

If the target position to which the stepping motor 214 is supposed to move is included in the fifth region, the DSP 300 determines a voltage corresponding to 80% of the maximum voltage determined in operation 905 as a driving voltage of the stepping motor 214 in operation 1021. Based on the above assumption, since the target position to which the stepping motor 214 is supposed to move is in the fifth region, the DSP 300 determines 3.06 V, which is 80% of the determined maximum voltage, 3.825 V, as a final driving voltage of the stepping motor 214.

Referring back to FIG. 9, if the final driving voltage of the stepping motor 214 is determined, the DSP 300 outputs a control signal for driving the stepping motor 214 at the determined driving voltage to the motor driver 213 in operation 911.

In operation 913, the motor driver 213 generates a step signal in response to the control signal received from the DSP 300, amplifies the step signal to a voltage and current of the step signal capable of driving the stepping motor 214, and outputs the amplified step signal to the stepping motor 214 to drive the stepping motor 214.

As described above, according to the embodiments of the invention, power consumption of image capturing apparatuses may be eventually reduced by reducing power consumption of a stepping motor by driving the stepping motor with different driving values depending on temperatures and positions thereof.

The invention can also be embodied as computer-readable codes on a computer-readable recording medium. The computer-readable recording medium is any data storage device that can store data which can be thereafter read by a computer system and executed by a processor of the system.

Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, functional programs, codes, and code segments for accomplishing the invention can be easily construed by programmers skilled in the art to which the invention pertains.

While the invention has been particularly shown and described with reference to exemplary embodiments thereof, it will be understood by those of ordinary skill in the art that various changes in form and details may be made therein without departing from the spirit and scope of the invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the invention.

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the embodiments of the invention and does not pose a limitation on the scope of the invention unless otherwise claimed. Numerous modifications and adaptations will be readily apparent to those skilled in this art without departing from the spirit and scope of the invention.

All cited references including publicized documents, patent applications, and patents cited in the invention can be merged in the invention in the same manner as the shown by individually and concretely merging each cited reference and the shown by generally merging each cited reference in the invention.

What is claimed is:

1. An apparatus for controlling a stepping motor, the apparatus comprising:
   a temperature measuring unit for measuring a temperature;
   a storage unit for storing temperature driving values of the stepping motor in correspondence with temperatures, storing a plurality of regions of a range of motion of the stepping motor, and storing a respective divided-region driving value for each of the plurality of regions, said divided-region driving values being different for different said regions; and
   a digital signal processor (DSP) for determining a measured temperature driving value by searching the storage unit and selecting a divided-region value corresponding to a respective one of the plurality of regions of the stepping motor in correspondence with the measured temperature, changing the determined driving value based on an absolute position of a target position to which the stepping motor is supposed to move, outputting the changed driving value to the stepping motor; and changing a shape of a driving pulse of the stepping motor based on the changed driving value.

2. The apparatus of claim 1, wherein the temperature measuring unit measures a surrounding temperature of a tube body.

3. The apparatus of claim 2, wherein the measured temperature driving value is at least one of a maximum voltage value and a maximum current value for driving the stepping motor.

4. The apparatus of claim 1, wherein the DSP stores temperature driving values for driving the stepping motor in correspondence with temperatures.

5. The apparatus of claim 4, wherein at least one of the measured temperature driving value and the temperature driving value is at least one of a maximum voltage value and a maximum current value for driving the stepping motor.

6. The apparatus of claim 1, wherein the DSP divides a moving section of the stepping motor into first to Nth regions and stores divided-region driving values corresponding to said regions which are differently applied to the stepping motor on a divided-region basis.

7. The apparatus of claim 6, wherein the DSP further outputs to the stepping motor a divided-region driving value corresponding to a region which includes the target position to which the stepping motor is supposed to move.

8. The apparatus of claim 6, wherein at least one of the measured temperature driving value and the divided-region driving value is at least one of a maximum voltage value and a maximum current value for driving the stepping motor.

9. An apparatus for controlling a stepping motor, the apparatus comprising:
   a storage unit for storing temperature driving values of the stepping motor in correspondence with temperatures, storing a plurality of regions of a range of motion of the stepping motor, and storing a respective divided-region driving value for each of the plurality of regions, said divided-region driving values being different for different said regions;
   a temperature measuring unit for measuring a temperature; and
   a digital signal processor (DSP) operative to:
   search the storage unit to determine a respective one of the measured temperature driving values corresponding to the measured temperature,
   identify a respective one of the plurality of regions containing a target position to which the stepping motor is supposed to move;
   search the storage unit for the respective said divided-region driving value for the identified region,
   find a driving value dependent on said determined measured temperature driving value and said respective divided-region driving value, and
   outputting the found driving value to the stepping motor.

10. The apparatus of claim 9, wherein the temperature measuring unit measures a surrounding temperature of a tube body.

11. The apparatus of claim 9, wherein the DSP divides the moving section of the stepping motor into first to Nth regions.

12. The apparatus of claim 9, wherein at least one of the temperature driving value, the measured temperature driving value, and the divided-region driving value is at least one of a maximum voltage value and a maximum current value for driving the stepping motor.

13. A method of controlling a stepping motor, the method comprising:
   measuring a temperature;
   storing, on a storage unit, temperature driving values of the stepping motor in correspondence with temperatures, storing a plurality of regions of a range of motion of the stepping motor, and storing a respective divided-region driving value for each of the plurality of regions, said divided-region driving values being different for different said regions;
   determining a measured temperature driving value by searching the storage unit and selecting a divided-region value corresponding to a respective one of a plurality of regions of the stepping motor in correspondence with the measured temperature; and
   changing the determined driving value based on an absolute position of a target position to which the stepping motor is supposed to move;
   outputting the changed driving value to the stepping motor; and
   changing a shape of a driving pulse of the stepping motor based on the changed driving value.

14. The method of claim 13, wherein, when the temperature is measured, a surrounding temperature of a tube body is measured.

15. The method of claim 14, wherein the measured temperature driving value is at least one of a maximum voltage value and a maximum current value for driving the stepping motor.

16. The method of claim 13, further comprising storing temperature driving values for driving the stepping motor in correspondence with temperatures.

17. The method of claim 16, wherein at least one of the measured temperature driving value and the temperature driving value is at least one of a maximum voltage value and a maximum current value for driving the stepping motor.

18. The method of claim 13, further comprising dividing a moving section of the stepping motor into first to Nth regions and storing divided-region driving values corresponding to said regions which are differently applied to the stepping motor on a divided-region basis.

19. The method of claim 18, further comprising:
searching for a region which includes the target position to which the stepping motor is supposed to move; and
outputting a divided-region driving value corresponding to the found region to the stepping motor.

20. The method of claim 18, wherein at least one of the measured temperature driving value and the divided-region driving value is at least one of a maximum voltage value and a maximum current value for driving the stepping motor.

21. A method of controlling a stepping motor, the method comprising:
establishing a storage unit;
storing in the storage unit temperature driving values of the stepping motor in correspondence with temperatures, regions of a range of motion of the stepping motor, and a divided-region driving value for each region, the values being different for different ones of the regions;
measuring a temperature;
obtaining a target position to which the stepping motor is supposed to move; and
searching the storage unit to determine a measured temperature driving value corresponding to the measured temperature, searching the storage unit for a divided-region driving value based on a said region including the target position, finding a driving value from the respective measured temperature driving value and the respective divided-region driving value, and outputting the found driving value to the stepping motor.

22. The method of claim 21, wherein, when the temperature is measured, a surrounding temperature of a tube body is measured.

23. The method of claim 21, wherein the moving section of the stepping motor is divided into first to Nth regions.

24. The method of claim 21, wherein at least one of the measured temperature driving value and the divided-region driving value is at least one of a maximum voltage value and a maximum current value for driving the stepping motor.

* * * * *